June 26, 1956     G. E. CARSON     2,751,741
RAKE ATTACHMENT FOR POWER MOWERS

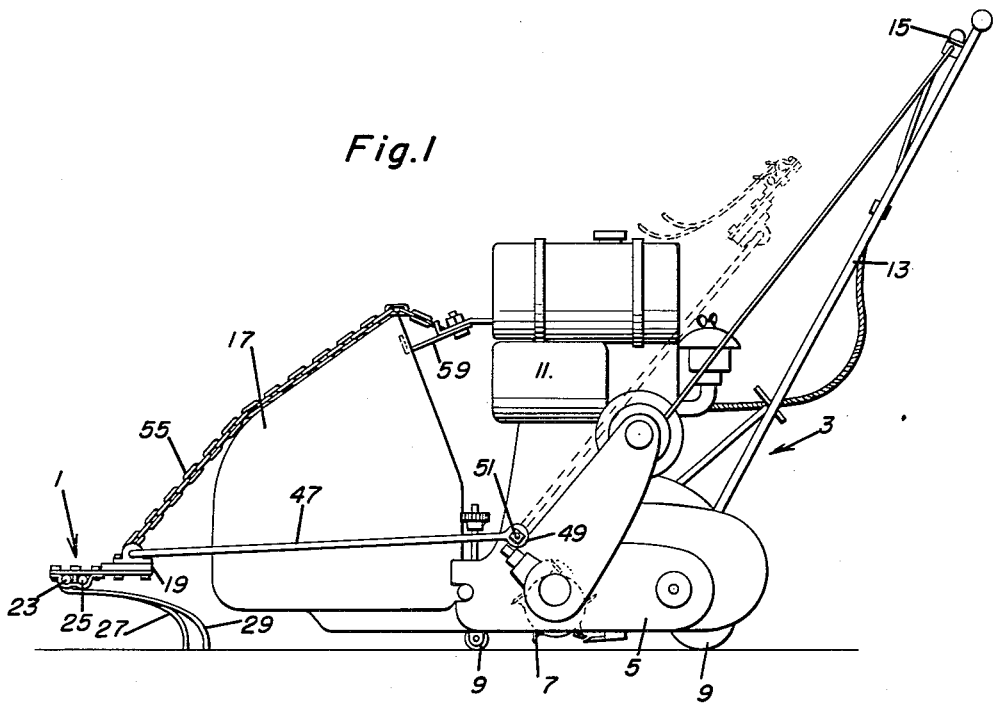
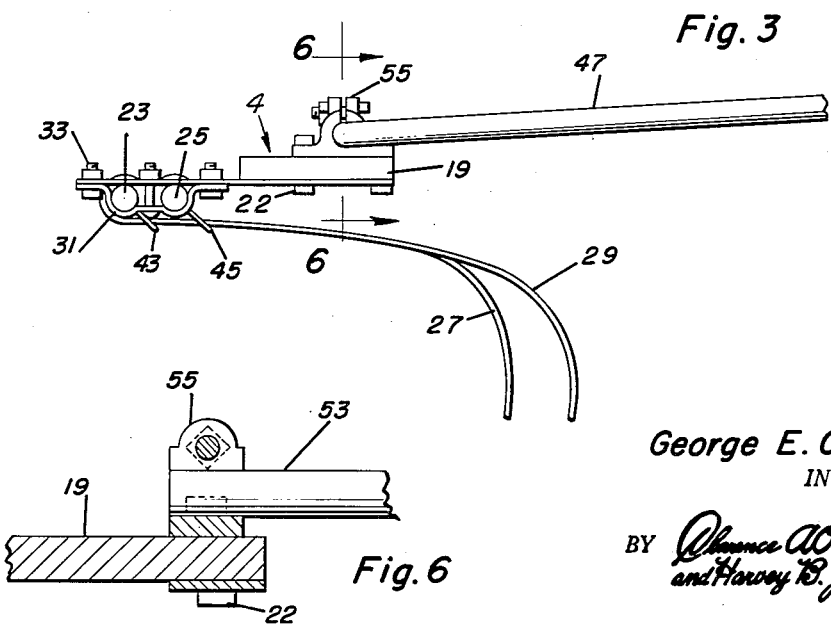

Filed Feb. 8, 1954     2 Sheets-Sheet 2

George E. Carson
INVENTOR.

though it may be read with reference to the drawing.

United States Patent Office 2,751,741
Patented June 26, 1956

2,751,741
RAKE ATTACHMENT FOR POWER MOWERS

George E. Carson, Denver, Colo.

Application February 8, 1954, Serial No. 408,827

1 Claim. (Cl. 56—27)

My invention relates to improvements in raking attachments for power mowers.

The primary object of my invention is to provide an efficient rake for attachment to a putting green lawn mower to comb the grass in front of the mower so as to straighten up matted grass for mowing, and which is easy to attach to such a mower, self-adjusting, on uneven ground, and adapted for adjusting into an out of the way position on the mower for transporting when not in use.

Another object is to provide in such an attachment novel efficient means for mounting tandem series of spring rake tines in alternating relation for most efficient operation.

Another object is to provide an attachment for the above purposes which is adapted for easy quick attachment to a conventional power mower such as are used on putting greens and without necessitating any appreciable change in the mower.

Other and subordinate objects together with the precise nature of my improvements will become apparent when the succeeding description is read with reference to the drawings accompanying and forming part of this specification.

In said drawings:

Figure 1 is a view in side elevation of my invention attached to the power mower and shown in full lines in position for use and in broken lines adjusted into an out of the way position when not in use;

Figure 3 is an enlarged fragmentary view in side elevation;

Figure 6 is an enlarged view in vertical transverse section taken on the line 6—6 of Figure 3.

Figure 2:
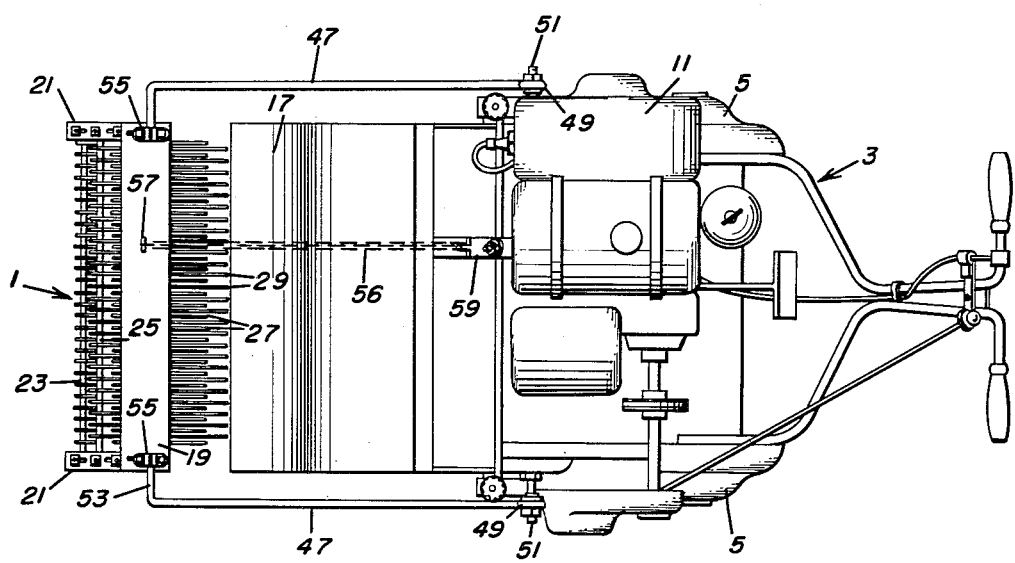
Figure 2 is a view in plan.
Figures 4, 5:
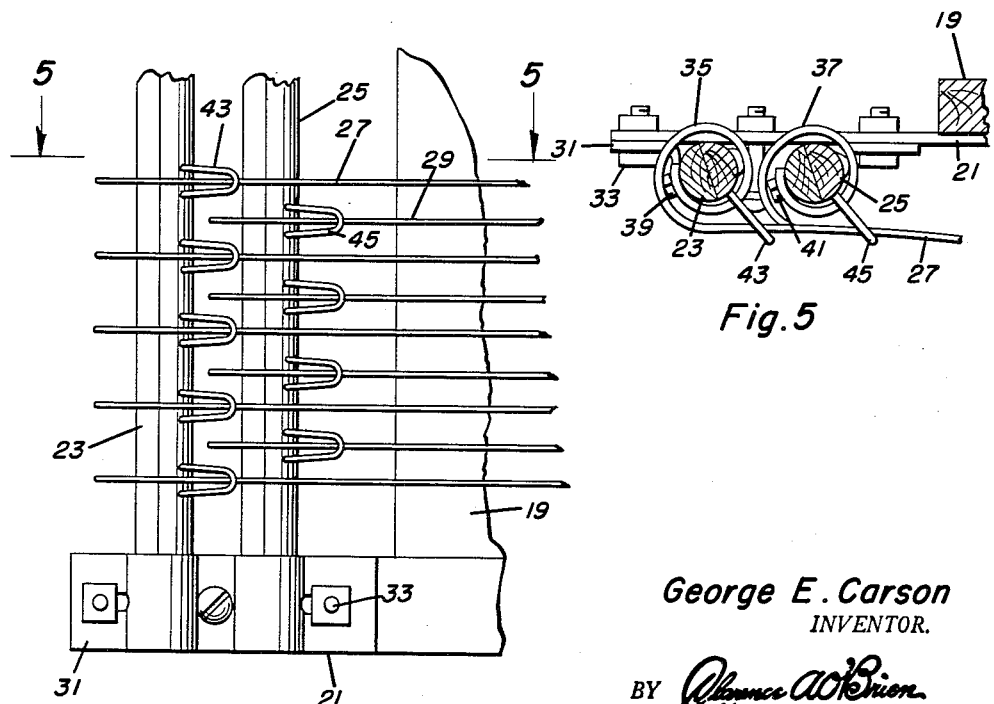
Figure 4 is an enlarged fragmentary view in plan of the same.
Figure 5 is a detail view in transverse section taken on the line 5—5 of Figure 4.

Referring to the drawings by numerals, my improved rake attachment designated generally by the numeral 1 has been shown therein as attached to a conventional type of power mower, designated 3, such as is commonly used on putting greens and comprising wheel supported side frame members 5, a cutter reel 7, a power plant 11, a handle 13, power plant controls 15, and a front grass catcher 17 carried by the side frame members 5.

The rake attachment 1 comprises a rake head 4 mounted on the frame members 5, by means presently described, for swinging downwardly and forwardly in front of the grass catcher 17 into raking position, or upwardly and rearwardly over said catcher 17 into an out of the way position for transporting when not in use.

The rake head comprises a preferably wooden rake head bar 19 extending transversely of the mower 3, a pair of transverse end bars 21 bolted to said bar 19, as at 22, to extend forwardly thereof when said head is in raking position and a pair of front and rear, laterally spaced tine carrying shafts 23, 25 spaced forwardly of and parallel to bar 19 when the head is in raking position.

A series of laterally spaced, hook type, like, rake tines 27, 29 extend rearwardly from each shaft 23, 25 beneath the rake head bar 19 with the tines of each series alternating with those of the other and the series 29 extending from the rear shaft 25 trailing those extending from the front shaft 23.

The tine carrying shafts 23, 25 are clamped at the ends thereof between the end bars 21 and yoke bars 31 bolted, as at 33, to the end bars beneath the same.

The tines 27, 29 are mounted on the shafts 23, 25 and tensioned to react downwardly of the head and to yield upwardly thereof when the head is in raking position. For this purpose the tines 27, 29 are formed with front end involute coils 35, 37 surrounding the shafts 23, 25 with terminal bolts 39, 41 securing the same to said shafts. To limit reaction of the tines 27, 29 downwardly which is to say away from the head, staple like stop members 43, 45 are provided on the shafts 23, 25 in straddling relation to the tines 27, 29.

The rake head is mounted on the mower 3 by means of a pair of supporting rods 47 at opposite sides of the mower 3. The rods 47 are provided with rear end eyes, as at 49, pivoted on lateral studs 51 on the side members 5 and the front ends of said rods 47 are provided with right angled ends 53 adapted to overlie the ends of the bar 19 and to be fixed thereto by clamps 55 secured to opposite ends of bar 19 by the beforementioned bolts 22, the arrangement being such that said bars 47 are swingable downwardly and forwardly to swing the rake head into raking position and upwardly to swing said head upwardly and rearwardly over the grass catcher 17.

A pull chain 56 is attached, as at 57, to the bar 19 and to a bracket 59 on the mower 3 to hold the rake head suspended in raking position.

As will be clear when the rake head is in raking position best shown in Figure 1, the tines 27, 29 will react downwardly to bite into the turf and straighten up matted grass as the mower 3 moves forwardly, but will yield upwardly in opposition to the weight of the head so as to prevent the tine from digging deeply into the ground and tearing grass out by the roots. When not in use the head may be swung into the out of the way inverted position shown in broken lines in Figure 1 and in which it is swung into upwardly and rearwardly inclined position to be held at rest against a suitable part of the mower 3.

Preferably the shafts 23, 25 are formed in half sections secured together by the bolts 39, 41 for economy in manufacturing.

It will be noted that the shafts 23, 25 may be clamped between the end bars 21 and the yoke bars 31 in different angular positions to adjust the series of tines 27, 29 in the rake head 4 vertically with respect to each other so that either or both may be used. Also, in the raking position in which the rake head 4 is suspended by the chain 56, the head bar 19 may be clamped by the clamps 55 to the ends 53 of the rods 47 in different angular positions to vary the angular position in which the working ends of said tines 27, 29 will comb the grass. Further, the yoke bars 31 may be loosened so that the ends of the shafts 23, 25 work freely therein and the series of tines 27, 29 are freely movable vertically in combining operations.

The foregoing will, it is believed, suffice to impart a clear understanding of my invention without further explanation.

Manifestly the invention is susceptible of modification without departing from the inventive concept, and right is herein reserved to such modifications as fall within the scope of the invention as herein described.

What is claimed as new is as follows:

A rake for attachment to a lawn mower in front thereof comprising a rake head including a head bar adapted to extend transversely in front of the lawn mower, a pair of laterally spaced shafts parallel with and in front of said head bar, tandem series of resilient rake tines extending rearwardly beneath said head bar with downwardly curved raking ends and other ends attached to said shafts, a pair of head bar supporting rods extending rearwardly from the ends of the head bar and having rear ends pivotally attachable to opposite sides of the lawn mower for upward and rearward swinging to swing said rake head upwardly and rearwardly from a raking position into an inverted position, a chain attached at one end to said head bar and attachable at its other end to the lawn mower to suspend said rake head in raking position, a pair of transverse bars on said head bar extending forwardly from the ends thereof, a pair of clamps coacting with said transverse bars to clamp the ends of said shafts therebetween with the shafts in different angular positions to adjust said series of tines vertically independently and adapted to be loosened to permit said series of tines to move vertically freely, and clamps for attaching the head bar to its supporting rods in different angular positions to adjust said rake head angularly in its raking position and vary the angle at which said tines will rake.

References Cited in the file of this patent

UNITED STATES PATENTS

| | | |
|---|---|---|
| 1,577,065 | Fuller | Mar. 16, 1926 |
| 2,143,402 | Baker | Jan. 10, 1939 |

FOREIGN PATENTS

| | | |
|---|---|---|
| 130,765 | Sweden | Feb. 6, 1951 |